(12) United States Patent
Kaul et al.

(10) Patent No.: US 6,559,306 B2
(45) Date of Patent: May 6, 2003

(54) DYE COMPOUNDS

(75) Inventors: Bansi Lal Kaul, Biel Benken (CH); Jean-Christophe Graciet, Huningue (FR)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/905,803

(22) Filed: Jul. 13, 2001

(65) Prior Publication Data

US 2002/0112297 A1 Aug. 22, 2002

(51) Int. Cl.$^7$ .......................... C09B 57/00; C09D 11/00
(52) U.S. Cl. .......................... 544/233; 546/29; 546/37; 546/38; 546/47; 546/98; 546/100; 106/31.47
(58) Field of Search .......................... 544/233; 546/29, 546/37, 38, 47, 98, 100; 106/31.47

(56) References Cited

U.S. PATENT DOCUMENTS

| | | | | |
|---|---|---|---|---|
| 4,007,192 A | * | 2/1977 | Fuchs et al. | 546/98 |
| 4,172,202 A | * | 10/1979 | Papenfuhs | 546/100 |
| 4,725,690 A | * | 2/1988 | Graser | 546/37 |
| 5,104,918 A | * | 4/1992 | Babler | 524/90 |
| 6,103,006 A | | 8/2000 | DiPietro | 106/493 |
| 6,166,210 A | * | 12/2000 | Langhals et al. | 546/37 |
| 6,462,128 B1 | * | 10/2002 | Barashkov et al. | 524/597 |

FOREIGN PATENT DOCUMENTS

| | | |
|---|---|---|
| WO | 99/21937 | 5/1999 |
| WO | 00/31039 | 6/2000 |

OTHER PUBLICATIONS

Zhao et al., Chemical Abstracts, 129:246510, 1998.*
Abla M. Kadhim (Miss), et al., "Mass–spectra Studies of Disperse Dyes I–Benzo [k,l] thioxanthene–3, 4–dicarboximides", JSDC, Aug. 1974, pp. 291–294.
Barashkov, et al., "Process of Making Finely Divided Opaque Particles", filed Jul. 14, 2000, U.S. application Ser. No. 09/616,356.
Great Britain Search Report for GB Application 0104236.5, mail date Aug. 21, 2001.
Chemical Abstract, abstract No. 134:234017 for WO 01/020334, Mar. 22, 2001.
Chemical Abstract, abstract No. 134:218307 for WO 01/017356, Mar. 15, 2001.
Chemical Abstract, abstract No. 134:208294 for J. Polym. Sci., Part A: Polym. Chem. 2000, Vol. date 2001, vol. 39(1) p. 239–252, Mar. 22, 2001.
Chemical Abstract, abstract No. 131:78500 for US 5,917, 045, Jun. 29, 1999.
Chemical Abstract, abstract No. 127:42032 for J. Phys. Chem. B, 1997, vol. 101 (23), p 4490–4493.
Chemical Abstract, abstract No. 82:32436 for J. Soc. Dyers Colour., 1974, vol. 90(8), p. 291–294.
Chemical Abstract, abstract No. 81:38960 for GB 1402803, Aug. 13, 1975.
Chemical Abstract, abstract No. 81:4670 for GB 1436903, May 26, 1976.
Chemical Abstract, abstract No. 77:141485 for JP 470009106, Mar. 16, 1972.
Chemical Abstract, abstract No. 75: 7375 for Vestn. Khar'kov. Politekh. Inst., 1969, No. 41, pp. 21–26 (from: Ref. Zh., Khim. 1970, Abstract No. 11B288).
Chemical Abstract, abstract No. 67:91380 for US 3,340,225, Sep. 5, 1967.

* cited by examiner

Primary Examiner—Fiona T. Powers
(74) Attorney, Agent, or Firm—Anthony A. Bisulca

(57) ABSTRACT

This invention relates to new fluorescent or non-fluorescent dye compounds having a terminal hydroxy, carboxylic acid/ester or amino group and a process for their preparation. The new fluorescent or non-fluorescent dye compounds are useful as colorants for preparing colored synthetic polymer resins with pigmentary properties, for dyeing or printing homo- or mixed synthetic, semi-synthetic or natural polymers or substrates or for preparing inks. The dye compounds provide excellent properties, especially high temperature stability and easy applicability.

5 Claims, No Drawings

DYE COMPOUNDS

This invention relates to new fluorescent or non-fluorescent dye molecules having a terminal hydroxy, carboxylic acid/ester or amino group.

BACKGROUND

Articles containing colorants are known to loose their colour when exposed to solar radiation for extended times. In particular, fluorescent colorants degrade more quickly than conventional colorants, often turning colourless on exposure to daily solar radiation within days or months.

Colorants not covalently bond in a polymer matrix tend to agglomerate and to crystalize leading to inhomogeneous distribution of colorants within the matrix. Fluorescent colorants in particular often loose their fluorescent properties by agglomeration of fluorescent sites (quenching). Furthermore with non covalently bond colorants, fading or bleeding of the colorant occurs.

U.S. Pat. No. 6,103,006 (DiPietro) discloses fluorescent polymeric pigments with increased lightfastness obtained by the polycondensation of dye monomers with at least two functional groups like diamine, dialcohol or dicarboxylic acid. The functional groups for the polycondensation are directly located at the dye moiety as in the anhydride or diacid form of the BXDA fluorescent dye.

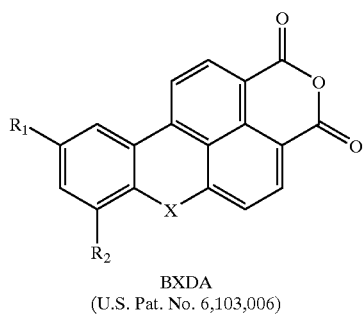

BXDA
(U.S. Pat. No. 6,103,006)

Besides the above mentioned polycondensation process the polyreaction of chain growth polymers can be utilised to react dye monomers into a polymer backbone. WO 99/21937 (3M) discloses a two phase interpenetrating polymer network system with a dye functionalized polymer in the second phase. The optionally fluorescent dye is covalently bond to the polymer to slow migration and to enhance compatibility, e.g. a hydroxy functional dye (YGOH) is reacted into a polyurethane or an acrylate functional dye (YGOAcr) is reacted into a respective chain growth polymer.

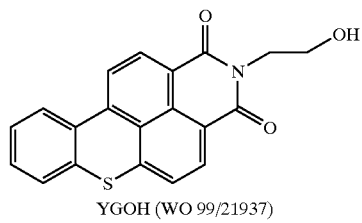

YGOH (WO 99/21937)

Other structures known to have dye properties are disclosed in WO 00/31039 in a completely different context: as pharmaceutically active compounds for the control of thrombotic disorders and for use as anti-adhesive substances for implants, catheters or heart pacemakers. The substituents are selected in view of pharmaceutical activity and applicability and the substituted benzo[de]isoquinoline-1,3-diones are not supposed to have any connective function.

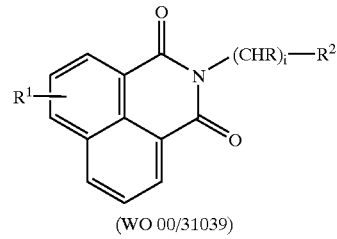

(WO 00/31039)

SUMMARY OF THE INVENTION

One objective of the present invention is to provide new dye compounds that have a connective functionality attached to the dye moiety by a spacer of a chain length of $C_3$ or longer. The dye compounds are useful useful as colorants for preparing colored synthetic polymer resins with pigmentary properties, for dyeing or printing homo- or mixed synthetic, semi-synthetic or natural polymers or substrates or for preparing inks.

DETAILED DESCRIPTION OF THE INVENTION

The dye compound is of the general formula (I)

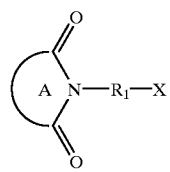

(I)

in which $R_1$ is $C_{3-12}$ alkylen, $C_2$ alkoxy alkylene, $C_{6-10}$ arylen, $(C_{6-10})$ aryl-$(C_{1-6})$ alkylen or $(C_{1-6})$ alkyl-$(C_{6-10})$ arylen, the alkylen and/or arylen radicals optionally being substituted by hydroxyl, $C_{1-6}$ alkoxyl, $C_{6-10}$ aryloxy or halogen, X is hydroxy, COOR' or NHR' with R' being hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, A is a substituted or unsubstituted fused aromatic or heterocyclic ring system, preferably of the general formula (III), (IV), (V), (VI), (VII) or (VIII)

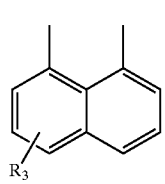

(III)

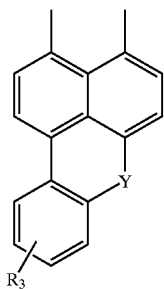 (IV)

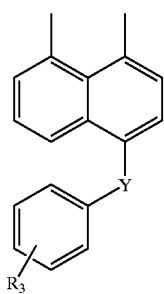 (V)

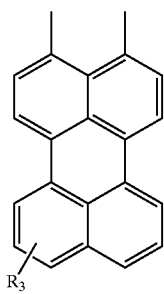 (VI)

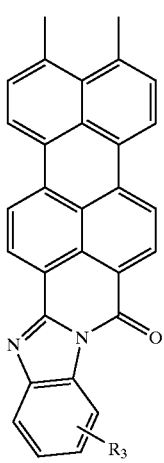 (VII)

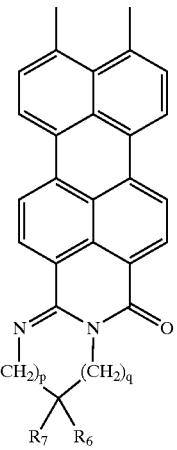 (VIII)

wherein $R_3$ is hydrogen, halogen, $NR_4R_5$, $R_4O$ or $R_4S$, with $R_4$ being hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, subsequently $R_5$ being hydrogen, $C_{2-6}$ alkyl, $C_{6-10}$ aryl, $(C_{6-10})$ aryl-$(C_{1-6})$ alkyl or $(C_{3-6})$ alkyl-$(C_{6-10})$ aryl, the alkyl radicals optionally being substituted by $C_{1-6}$ alkoxyl, $C_{6-10}$ aryloxy or halogen, the aryl radicals optionally being substituted by hydroxyl, $C_{1-6}$ alkoxyl, $C_{6-10}$ aryloxy or halogen, with the provisio that $R_4$ is to be chosen first and if $R_4$ is hydrogen, $R_5$ can only be hydrogen; Y being sulphur, oxygen or $NR_4$, with $R_4$ having the meaning given above, $R_6$ and $R_7$ are identical or different and are hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$aryloxy or halogen and p and q are 0–12

Another dye compound is of the general formula (II)

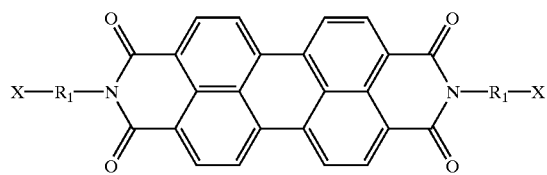 (II)

wherein $R_1$ and X have the meaning given above,
with the proviso that for X being $NH_2$, $R_1$ being $C_6$ alkylen is excluded and with the proviso that for X being OH, $R_1$ being $C_3$ alkylen is excluded.

Especially preferred dye compounds are those of the general formula (I) where A is of the general formula (IV), with Y being sulphur and $R_3$ being hydrogen, where A is of the general formula (VI) with $R_3$ being hydrogen, where A is of the general formula (VII) with $R_3$ being hydrogen and where A is of the general formula (VIII) with $R_6$ and $R_7$ being methyl and p and q being 1.

The preferred spacer $R_1$ is a $C_{3-6}$ alkylen, most preferably $C_6$ alkylen. Another preferred spacer $R_1$ is a ethoxy-ethoxy-ethylene.

Preferred terminal groups X are hydroxy or NHR' with R' being preferably hydrogen, methyl or ethyl.

The dye compounds of formulae (I) are obtained by the condensation of the dicarboxylic anhydride of the respective dye moiety with an aminoalcohol, an aminoacid/ester or a diamine comprising the respective spacer in a polar aprotic solvent.

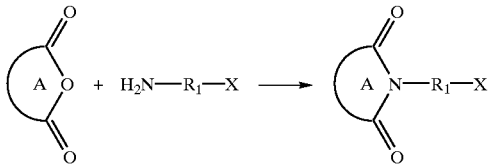

The hydroxy, carboxylic acid/ester or amino group on the free end of the spacer can be reacted into a polymer network, e.g. polyurethane, polyester or aminoformaldehyde resin.

To obtain such colored polymer resins, the dye compound is mixed into a respective reactive mixture comprising isocyanates or formaldehyde and optionally other carboxy, hydroxy or amine functionalized compounds before the reaction is carried out. The polyreactions to obtain polyurethane, polyester or aminoformaldehyde resins are well known in the art.

The dye compounds according to the invention may be used for dyeing dyeable materials such as homo- or mixed synthetic, semi-synthetic or natural polymers e.g. acrylonitrile, polyester, polyurethane, polyamide, wool, leather, cotton, bast fibers such as hemp, flax, sisal, jute, coir and straw; regenerated cellulose fibers, glass or glass products comprising glass fibers; and substrates comprising cellulose for example paper and cotton. They may also be used for printing fibers, filaments and textiles comprising any of the above mentioned materials in accordance with known methods. The compounds of the present invention may be further used in the preparation of inks, e.g. ink jet inks in accordance with conventional methods.

The colored polymer resins are suitable for the mass pigmentation of synthetic resins, e.g. polyurethane masses, polyester or aminoformaldehyde resins.

The obtained resins are suitable, as colorants in powders and powder coating materials, especially in triboelectrically or electrokinetically sprayable powder coating materials which are used for the surface coating of articles made, for example, from metal, wood, plastic, glass, ceramic, concrete, textile material, paper or rubber.

Powder coating resins that are typically employed are epoxy resins, carboxyl- and hydroxyl-containing polyester resins, polyurethane resins and acrylic resins, together with customary hardeners. Combinations of resins are also used. For example, epoxy resins are frequently employed in combination with carboxyl- and hydroxyl-containing polyester resins. Typical hardener components (as a function of the resin system) are, for example, acid anhydrides, imidazoles and also dicyanodiamide and its derivatives, blocked isocyanates, bisacylurethanes, phenolic and melamine resins, triglycidyl isocyanurates, oxazolines and dicarboxylic acids.

The following examples illustrate the invention. Unless otherwise specified, parts and percentages used in the examples are on a weight to weight basis.

Example 1

Benzothioxanthene dicarboxylic anhydride (10 parts) is condensed to 6-aminohexanol (6 parts) in dimethylformamide (6 parts) in presence of catalytic para-toluenesulfonic acid (0.1 part) at 130° C. under nitrogen atmosphere.

When the reaction is complete, the resulting mixture is cooled to 60° C. and 3 parts of methanol are added. After cooling to room temperature, the final product is filtered, washed with methanol and dried. 12 parts of bright orange powder are obtained (93% yield).

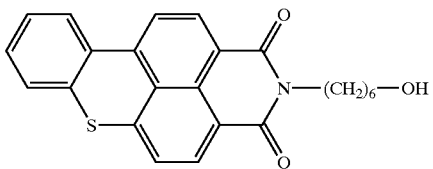

Example 2

57 parts of hexamethylenediamine are melted at 80° C. under nitrogen atmosphere. 10 parts of benzo[k,l]-thioxanthene-3,4-dicarboxylic acid anhydride are added over a 3 hours period at this temperature. After completion of the addition, the resulting fluorescent suspension is stirred for 2 hours at 80° C. 250 parts of water are then introduced at this temperature and the reaction mixture is stirred for one hour. The mixture is then added to 250 parts of hot water (80° C.). The final suspension is filtered at this temperature, washed with hot water (80° C.) and then dried. 12 parts of final colorant are obtained as an orange-colored powder.

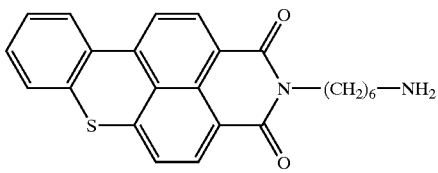

Example 3

2,2'-(ethylenedioxy)-diethylamine (40 parts) are heated to 70° C. under nitrogen atmosphere. Benzothioxanthene anhydride (10 parts) is slowly added at this temperature over a period of 3 hours. After reaction completion, 40 parts of water are added and the resulting mixture is stirred at 70° C. for 30 minutes. The suspension is then filtered, washed with water and dried. 10 parts of orange powder are obtained (yield 80%).

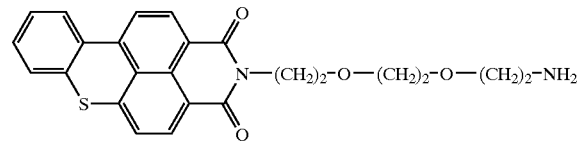

Example 4

45 parts of hexamethylenediamine are melted at 80° C. under nitrogen atmosphere. 10 parts of perylene dicarboxylic acid anhydride are added over a 3 hours period at this temperature. After completion of the addition the resulting suspension is stirred for 2 hours at 80° C. 200 parts of water are then introduced at this temperature and the reaction mixture is stirred for one hour. The mixture is then added to 200 parts of hot water (80° C.). The final red suspension is filtered at this temperature, washed with hot water (80° C.) and then dried. This gives 13 parts of a red-colored powder.

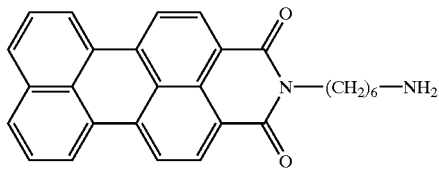

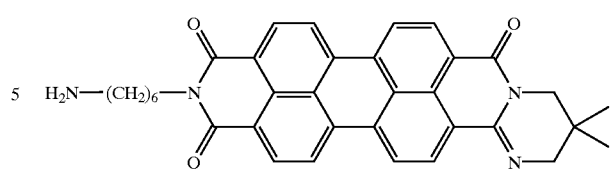

Example 5

10 parts of perylene tetracarboxylic acid dianhydride and 5.7 parts of potassium hydroxide are suspended in 150 parts of water. The red suspension is heated to 100° C. and stirred at this temperature for 1 hour. The reaction mixture is cooled to 80° C. and hydrochloric acid is added until pH reached 7. The suspension is then stirred at 80° C. for 30 minutes, cooled to 25° C., washed with water and dried. 10 parts of the resulting red powder are suspended in 4 parts of o-phenylenediamine, 3 parts of zinc acetate and 1 part of chinolin. The reaction mixture is heated to 200° C. and stirred for 2 hours at this temperature. After cooling to 25° C. the reaction mixture is filtered and washed with methanol and then with water. Hydrochloric acid is added to 10 parts of the resulting red powder firstly suspended in 100 parts of water, in order to reach pH 1. The reaction mixture is stirred 30 minutes at 100° C., filtered and washed with water. 10 parts of the presscake are added over a 3 hours period to 20 parts of melted hexamethylenediamine at 100° C. under nitrogen atmosphere. The reaction mixture is stirred 4 hours at 100° C. and precipitated in 200 parts of hot water. The reaction mixture is then filtered at 80° C., washed with hot water and dried to provide 10 parts of a red-colored powder.

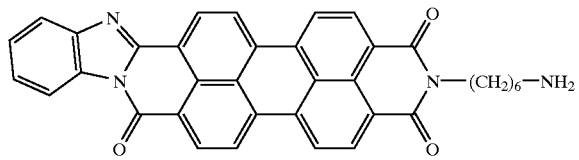

Example 6

10 parts of perylene tetracarboxylic acid dianhydride and 5.7 parts of potassium hydroxide are suspended in 150 parts of water. The red suspension is heated to 100° C. and stirred at this temperature for 1 hour. The reaction mixture is cooled to 80° C. and hydrochloric acid is added until pH reached 7. The suspension is then stirred at 80° C. for 30 minutes, cooled to 25° C., washed with water and dried. 10 parts of the red powder are suspended in 15 parts of water and 4 parts of 1,3-diamino-2,2-dimethylpropane. The reaction mixture is heated to reflux for 2 hours. After cooling to 25° C. the reaction mixture is filtered and washed with water. Hydrochloric acid is added to 10 parts of the resulting red presscake firstly suspended in 100 parts of water, in order to reach pH 1. The reaction mixture is stirred 30 minutes at 100° C., filtered and washed with water. 10 parts of the presscake are added over a 3 hours period to 20 parts of melted hexamethylenediamine at 100° C. under nitrogen atmosphere. The reaction mixture is stirred 4 hours at 100° C. and precipitated in 200 parts of hot water. The reaction mixture is then filtered at 80° C., washed with hot water and dried to provide 12 parts of a red-colored powder.

Example 7

35 parts of tetramethylenediamine are melted at 100° C. under nitrogen atmosphere. 10 parts of perylene tetracarboxylic acid dianhydride are added over a 3 hours period at this temperature. The resulting red suspension is stirred for 6 hours at 100° C. 100 parts of 5% potassium hydroxide solution in water are then introduced at this temperature and the reaction mixture is stirred for 30 minutes. The suspension is then filtered at 80° C., washed with hot water (80° C.) and then dried. This gives 12 parts of a red-colored powder.

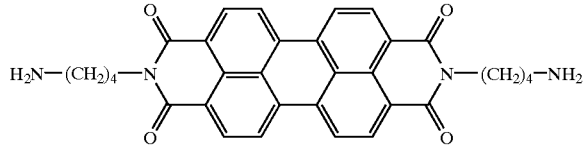

Example 8

Perylene tetracarboxylic dianhydride (10 parts) is condensed to 3-methylamino propylamine (25 parts) in ethanol (2.5 parts) under nitrogen atmosphere at 90° C. When reaction is complete, the mixture is cooled to room temperature and filtered. The dark red presscake is poured into 100 parts of water and stirred for 30 minutes at 70° C. After filtration and washing with water, the product is dried and 11 parts of dark red powder are obtained (93% yield).

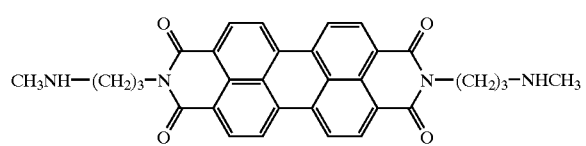

Example 9

2,2'-(ethylenedioxy)-diethylamine (40 parts) are heated to 80° C. under nitrogen atmosphere. Perylene tetracarboxylic dianhydride (10 parts) is slowly added at this temperature over a period of 3 hours. When the reaction is complete, the mixture is cooled to room temperature and filtered. The dark red presscake is poured into 100 parts of water and stirred for 30 minutes at 70° C. After filtration and washing with water, the product is dried and 15.5 parts of dark red powder are obtained (93% yield).

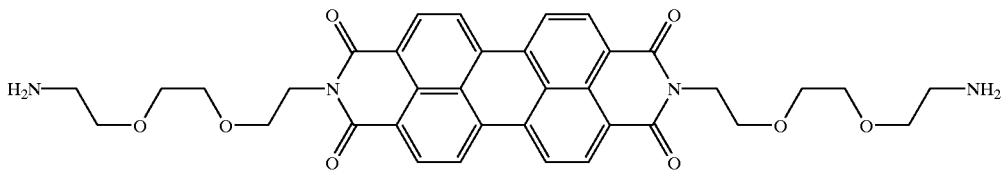

What is claimed is:

1. A dye compound of the general formula (I)

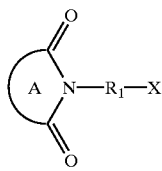

(I)

wherein $R_1$ is $C_6$ alkylene, or ethoxy-ethoxy-ethylene,

X is hydroxy, COOR' or NHR' group with R' being hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, and A is of the general formula, (IV), (V), (VI), (VII) or (VIII)

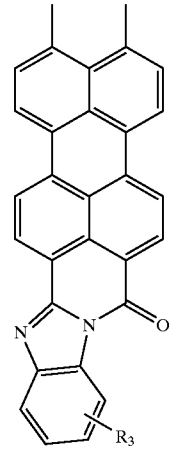

(IV)

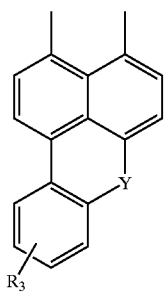

(V)

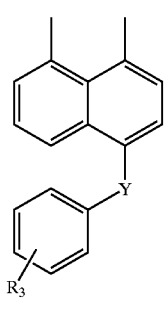

(VI)

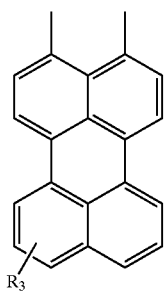

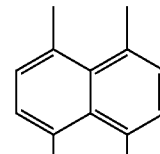

(VII)

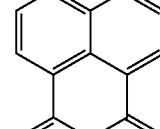

(VIII)

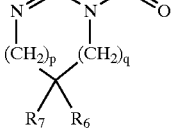

wherein $R_3$ is hydrogen, halogen, $NR_4R_5$, $R_4O$ or $R_4S$, in which $R_4$ is hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, $R_5$ is hydrogen, $C_{2-6}$ alkyl, $C_{6-10}$ aryl, $(C_{6-10})$ aryl-$(C_{1-6})$ alkyl or $(C_{3-6})$ alkyl-$(C_{6-10})$ aryl, the alkyl radicals optionally being substituted by $C_{1-6}$ alkoxyl, $C_{6-10}$ aryloxy or halogen, the aryl radicals optionally being substituted by hydroxyl, $C_{1-6}$ alkoxyl, $C_{6-10}$ aryloxy or halogen, with the provisio that $R_4$ is to be chosen first and if $R_4$ is hydrogen, $R_5$ can only be hydrogen;

Y being sulphur, oxygen or $NR_4$, with $R_4$ having the meaning given above, $R_6$ and $R_7$ are identical or different and are hydrogen, $C_{1-6}$alkyl, $C_{6-10}$aryl, $(C_{6-10})$aryl-$(C_{1-6})$alkyl or $(C_{1-6})$alkyl-$(C_{6-10})$aryl, it being possible for the alkyl and/or aryl radicals to be substituted by hydroxyl, $C_{1-6}$alkoxy, $C_{6-10}$aryloxy or halogen and p and q are 0–12.

2. A dye compound according to claim 1, wherein

X is hydroxy or NHR' group with R' being hydrogen, methyl or ethyl, and

A is of the general formula (IV), (VI), (VII) or (VIII)

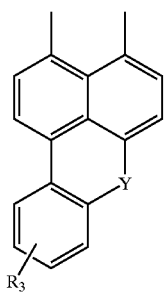
(IV)

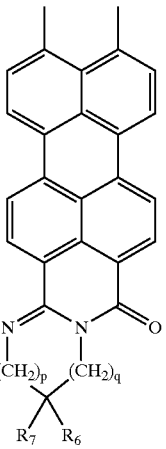
(VIII)

wherein $R_3$ is hydrogen,

Y being sulphur, $R_6$ and $R_7$ are methyl, and p and q are 1.

3. A process for the preparation of hydroxy, carboxylic acid/ester or amino functionalized dye compounds of the general formula (I)

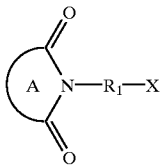
(I)

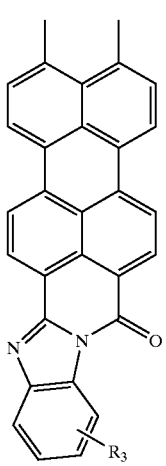
(VI)
(VII)

with $R_1$ is $C_{3-12}$ alkylene, $C_2$ alkoxy-alkylene, $C_{6-10}$ arylene, $(C_{6-10})$ aryl-$(C_{1-6})$ alkylene or $(C_{1-6})$ alkyl-$(C_{6-10})$ arylene, the arylene and/or arylene radicals optionally being substituted by hydroxyl, $C_{1-6}$ alkoxyl, $C_{6-10}$ aryloxy or halogen, X is hydroxy, COOR' or NHR' group with R' being hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, and A is of the general formula, (IV), (V), (VI), (VII) or (VIII)

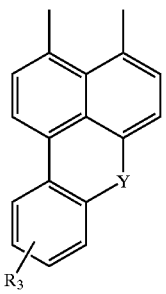
(IV)

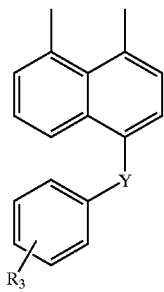 (V)

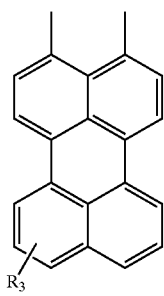 (VI)

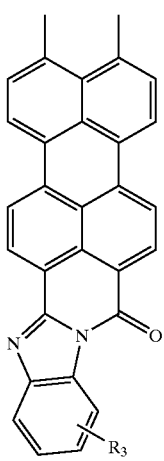 (VII)

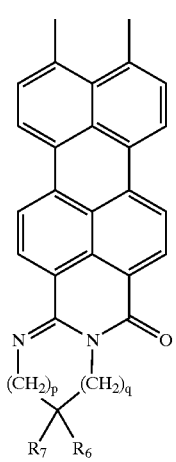 (VIII)

wherein $R_3$ is hydrogen, halogen, $NR_4R_5$, $R_4O$ or $R_4S$, in which $R_4$ is hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, $R_5$ is hydrogen, $C_{2-6}$ alkyl, $C_{6-10}$ aryl, $(C_{6-10})$ aryl-$(C_{1-6})$ alkyl or $(C_{3-6}$ alkyl-$(C_{6-10})$ aryl, the alkyl radicals optionally being substituted by $C_{1-6}$ alkoxyl, $C_{6-10}$ aryloxy or halogen, the aryl radicals optionally being substituted by hydroxyl, $C_{1-6}$ alkoxyl, $C_{6-10}$ aryloxy or halogen, with the provisio that $R_4$ is to be chosen first and if $R_4$ is hydrogen, $R_5$ can only be hydrogen;

Y being sulphur, oxygen or $NR_4$, with $R_4$ having the meaning given above, $R_6$ and $R_7$ are identical or different and are hydrogen, $C_{1-6}$alkyl, $C_{6-10}$aryl, $(C_{6-10})$aryl-$(C_{1-6})$alkyl or $(C_{1-6})$ alkyl-$(C_{6-10})$aryl, it being possible for the alkyl and/or aryl radicals to be substituted by hydroxyl, $C_{1-6}$alkoxy, $C_{6-10}$aryloxy or halogen and p and q are 0–12, comprising the step of reacting In a condensation reaction the dicarboxylic anhydride of the respective dye moiety with an aminoalcohol an aminoacid/ester or a diamine comprising the respective spacer under polar aprotic conditions.

4. A colorant for preparing colored synthetic polymer resins comprising the dye compound according to claim 1.

5. An ink composition comprising the dye compound of the general formula (I)

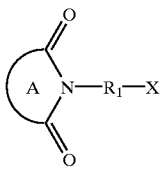 (I)

with $R_1$ is $C_{3-12}$ alkylene, $C_2$ alkoxy-alkylene, $C_{6-10}$ arylene, $(C_{6-10})$ aryl-$(C_{1-6})$ alkylene or $(C_{1-6})$ alkyl-$(C_{6-10})$ arylene, the arylene and/or arylene radicals optionally being substituted by hydroxyl, $C_{1-6}$ alkoxyl, $C_{6-10}$ aryloxy or halogen, X is hydroxy, COOR' or NHR' group with R' being hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, and A is of the general formula, (IV), (V), (VI), (VII) or (VIII)

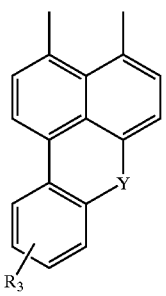 (IV)

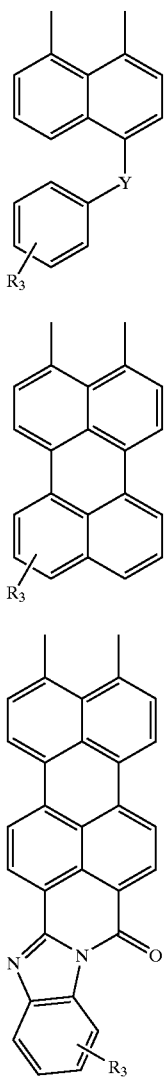

(V)

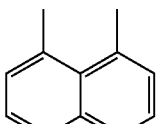

(VI)

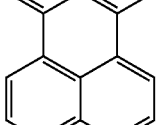

(VII)

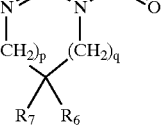

(VIII)

wherein $R_3$ is hydrogen, halogen, $NR_4R_5$, $R_4O$ or $R_4S$, in which $R_4$ is hydrogen, $C_{1-6}$ alkyl, $C_{6-10}$ aryl, $(C_{6-10})$ aryl-$(C_{1-6})$ alkyl or $(C_{1-6})$ alkyl-$(C_{6-10})$ aryl, the alkyl and/or aryl radicals optionally being substituted by hydroxyl, $C_{1-6}$ alkoxyl, $C_{6-10}$ aryloxy or halogen, $R_5$ is hydrogen, $C_{2-6}$ alkyl, $C_{6-10}$ aryl, $(C_{6-10})$ aryl-$(C_{1-6})$ alkyl or $(C_{3-6})$ alkyl-$(C_{6-10})$ aryl, the alkyl radicals optionally being substituted by $C_{1-5}$ alkoxyl, $C_{6-10}$ aryloxy or halogen, the aryl radicals optionally being substituted by hydroxyl, $C_{1-6}$ alkoxyl, $C_{6-10}$ aryloxy or halogen, with the proviso that $R_4$ is to be chosen first and if $R_4$ is hydrogen, $R_5$ can only be hydrogen;

Y being sulphur, oxygen or $NR_4$, with $R_4$ having the meaning given above, $R_6$ and $R_7$ are identical or different and are hydrogen, $C_{1-6}$alkyl, $C_{6-10}$aryl, $(C_{6-10})$aryl-$(C_{1-6})$alkyl or $(C_{1-6})$ alkyl-$(C_{6-10})$aryl, it being possible for the alkyl and/or aryl radicals to be substituted by hydroxyl, $C_{1-6}$alkoxy, $C_{6-10}$aryloxy or halogen and p and q are 0–12.

* * * * *